United States Patent
Butler et al.

(10) Patent No.: US 6,654,316 B1
(45) Date of Patent: Nov. 25, 2003

(54) SINGLE-SIDED ELECTRO-MECHANICAL TRANSDUCTION APPARATUS

(76) Inventors: John L. Butler, 56 Margin St., Cohasset, MA (US) 02025; Alexander L. Butler, 82 Granite Pl., Milton, MA (US) 02186

( * ) Notice: Subject to any disclaimer, the term of this patent is extended or adjusted under 35 U.S.C. 154(b) by 0 days.

(21) Appl. No.: 10/138,348

(22) Filed: May 3, 2002

(51) Int. Cl.[7] .............................................. H04R 17/00
(52) U.S. Cl. ........................ 367/157; 367/158; 310/334
(58) Field of Search .................................. 367/157, 158, 367/163, 165, 176; 310/334, 328, 330

(56) References Cited

U.S. PATENT DOCUMENTS

| 4,326,275 A | 4/1982 | Butler |
| 4,438,509 A | 3/1984 | Butler et al. |
| 4,443,731 A | 4/1984 | Butler et al. |
| 4,742,499 A | 5/1988 | Butler |
| 4,754,441 A | 6/1988 | Butler |
| 4,845,688 A | 7/1989 | Butler |
| 4,864,548 A | 9/1989 | Butler |
| 5,047,683 A | 9/1991 | Butler et al. |
| 5,184,332 A | 2/1993 | Butler |
| 5,742,561 A | * 4/1998 | Johnson ...................... 367/157 |
| 6,465,936 B1 | 10/2002 | Knowles et al. |

* cited by examiner

*Primary Examiner*—Ian J. Lobo

(57) ABSTRACT

An electro-mechanical transducer, which provides amplified piston motion from an orthogonal drive direction wherein the electro-mechanical drive additionally provides the inertial reactive mass for the moving mass of the piston. The piston motion is amplified by lever arms, which are typically attached to a piezoelectric or electrostrictive drive system. The arrangement allows a compact, high output transducer design.

47 Claims, 9 Drawing Sheets

SINGLE-SIDED ELECTRO-MECHANICAL TRANSDUCTION APPARATUS

This invention was made with U.S. Government support under Contract No. N0001401-C-0051 awarded by the Office of Naval Research and Contract No. N66604-99-C-2807 awarded by NAVSEA and SPAWAR. The Government may have certain rights in this invention.

BACKGROUND OF THE INVENTION

1. Field of the Invention

The present invention relates in general to transducers, and more particularly to acoustic transducers. The present invention also relates to a compact transducer capable of radiating acoustic energy from large magnified displacements, preferably through an orthogonal drive arrangement.

2. Background and Discussion

An electro-mechanical apparatus is shown in my earlier granted U.S. Pat. No. 4,845,688. This transducer construction uses lever arms or shells, which are connected to active piezoelectric, electrostrictive or magnetostrictve elements to drive one or two pistons with amplified motion The active elements are in the form of, but not limited to, bars, rings and plates. The second piston is replaced with a larger shielded inertial mass for radiation from the first piston alone. Another electro-mechanical apparatus is shown in another earlier granted U.S. Pat. No. 4,754,441 of mine. Here a bending motion of the drive system is used to move a flextensional shell. Although the structures shown in these patents are effective for most applications, there is still a need to provide a reduced size apparatus that yet provides an effective output signal.

Accordingly, it is an object of the present invention to provide an electro-mechanical transduction apparatus that is readily adapted to be constructed in a very compact structure yet providing an effective output signal.

Another object of the present invention is to provide a single piston transduction apparatus in which the need for an inertial tail mass is eliminated.

A further object of the present invention is to provide a bender mode driven orthogonal electromechanical drive apparatus for a piston transducer.

SUMMARY OF THE INVENTION

To accomplish the foregoing and other objects, features and advantages of the invention there is provided an improved electro-mechanical transduction apparatus that employs a structure for utilizing the electro-mechanical driver in a dual way so that it, not only moves the lever arms and the piston, but also acts as an inertial mass for the driven piston to move against. The piston and the inertial reaction mass move along an axial direction while the drive system simultaneously moves in an orthogonal direction and yet also provides the axial inertial reaction mass.

In accordance with one aspect of the invention there is provided an electro-mechanical transduction apparatus comprising: a shell or beam structure having orthogonally disposed first and second shell axes; a transduction drive means having moving ends; means connecting the transduction drive means at its moving ends to the shell and disposed for drive along said first shell axis; a mechanical load; means connecting the load to the shell at at least one location along the second shell axis and at a position outside of the transducer shell; and means for exciting the transduction drive means to cause the shell, and the drive means, to move along the direction of the second axis for driving the load to, in turn, provide energy radiation therefrom.

In accordance with another aspect of the invention there is provided an electro-mechanical transduction apparatus comprising: an electro-mechanical driver; a mechanical load; and at least one deflection structure supported from the driver and for coupling to drive the load. The driver, deflection structure and mechanical load are constructed and arranged to define a drive axis, and orthogonal thereto, an orthogonal axis. The driver, when driven, provides a reactive mass that moves relative to the mass of the load, both in the direction of the drive axis, while the electro-mechanical driver itself simultaneously moves in the direction of the orthogonal axis.

In accordance with a further aspect of the invention there is provided an electro-mechanical transduction apparatus comprising: a deflection structure having orthogonally disposed first and second structure axes; a transduction driver having moving ends; the transduction driver coupled at its moving ends to the deflection structure and disposed for drive along the first structure axis; a mechanical load. The mechanical load is coupled to the deflection structure at at least one location of the second structure axis. The transduction driver is excited to cause the deflection structure and the driver, to move along the direction of the second axis for driving said load to, in turn, provide energy radiation therefrom.

In accordance with still another aspect of the invention there is provided a method of electro-mechanical transduction comprising the steps of: driving an electro-mechanical drive member in a first axis direction to, in turn, drive, through a deflection structure, a load in a second axis direction, orthogonal to said first axis direction; the electro-mechanical drive member, when driven, providing a reactive mass that moves relative to the mass of the load, both in the direction of the second axis, as the electro-mechanical drive member itself simultaneously moves in the direction of the first axis.

BRIEF DESCRIPTION OF THE DRAWINGS

Numerous other objectives, features and advantages of the invention should now become apparent upon reading of the following detailed description taken in conjunction with the accompanying drawings, in which:

FIG. 2AA illustrates a series wired piezoelectric plate with silvered electrode surfaces.

FIG. 2AB illustrates a general wiring scheme for series or parallel wiring.

DETAILED DESCRIPTION

Figure 1A:
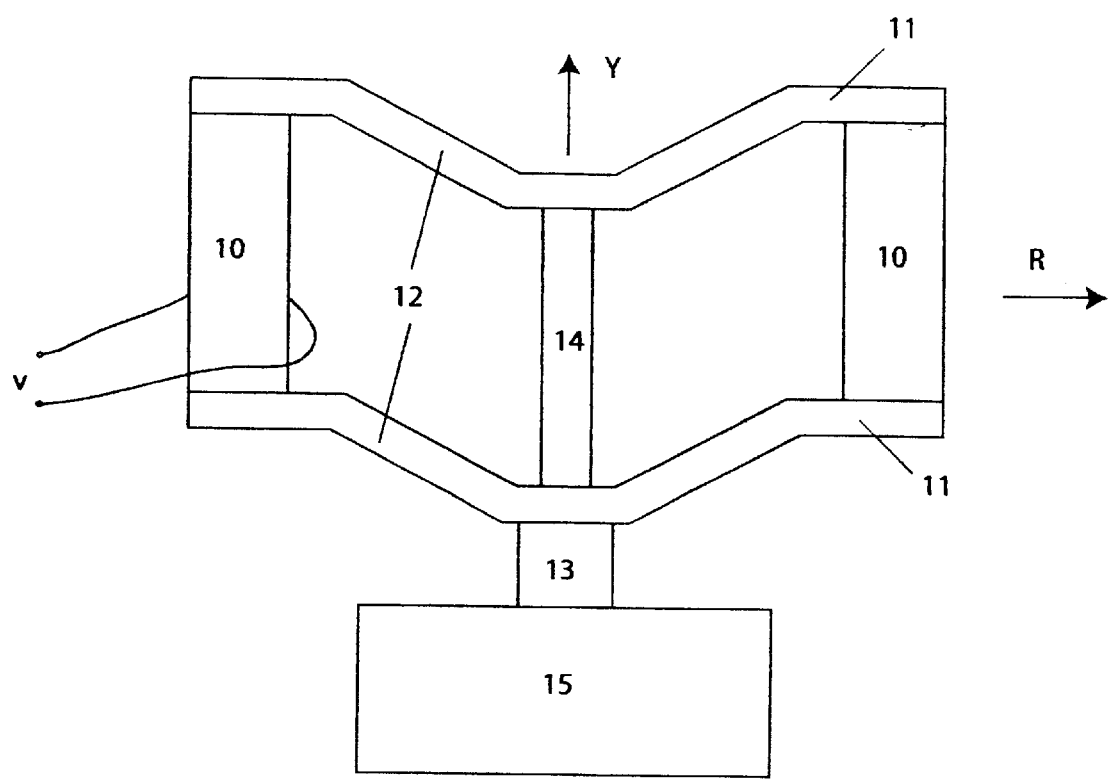
FIG. 1A schematically illustrates a piezoelectric cylinder or ring driver with center load mount actuation.

In accordance with the present invention, there is now described herein a number of different embodiments for practicing the invention. In one aspect of the invention there is provided a transducer for obtaining a large displacement by means of a piston transducer that can be constructed in a relatively compact size. In accordance with the present invention there is also provided a mechanical lever or spring that may be energized at one end or multiple ends by either piezoelectric, electrostrictive or magnetostrictive members. In either instance the lever arms, shell or spring amplify the motion of the active material producing a large displacement at the piston or other load attached to the point of greatest motion for electro-acoustic transduction or actuation. The magnified shell, piston or load motion is achieved through the inverse slope of the lever arms or shell as ends of the electro-mechanical drive move orthogonally to the piston motion. This results in a force, which moves the piston mass relative to the mass of the drive system with both masses in a direction: orthogonal to the electro-mechanical drive system. The electro-mechanical driver may be excited to provide extensional longitudinal or inextensional bender type motion.

In accordance with one aspect of the invention there is provided an electro-mechanical transduction apparatus that is comprised of a shell, shells or lever arms generally composed of two axes having orthogonally disposed first and second respective axes wherein the drive system moves along the first axis and a piston or other load moves along the second axis. The piston could be an acoustical radiator and the load could be an optical mirror or other load moved by the system acting as an actuator. The lever arms provide a magnified displacement of electro-mechanical motion and apply this magnified motion to the piston. As the electro-mechanical driver moves along the first axis, the piston moves along the second axis and in reaction to the piston motion the driver also moves along the second axis. Thus, the driver system serves a dual purpose reducing both the weight and size of the system. The dual purpose of the driver system includes, simultaneously, movement in the first direction to drive the load, and movement in the second direction, orthogonal to the first, to provide the axial inertial reaction mass.

The driver system, such as a stack of electrostrictive or magnetostrictive material, may typically take the form of extensional bars, discs, rings or cylinders. However, in accordance with the invention an inextensional mode of vibration, such as a bender mode bar or plate, may also be used to drive the lever arms. Such a feature allows an even more compact lower frequency drive system.

The lever arm bars may take the form of bars, without or with notches, near the drive point to achieve a better hinge like boundary condition. The magnification factor is approximately equal to the reciprocal of the slope of the lever arms. Shells may also be used as a substitute for lever arms and the shells may be slotted for reduced circumferential stiffness and notched for reduced bending. The shells may be typically cone-shaped or curved, and be convex or concave.

The acoustic radiating piston may typically take the form of a tapered circular, square or rectangular, flat or curved, piston and would be in contact with the medium while the remaining part of the system may be enclosed in a housing to isolate these parts. A housing may not be necessary if the system is used as an actuator or valve. The actuator load or the piston could be connected to the point of greatest motion at the apex of the shell or lever arms.

In one specific embodiment of the invention a piezoelectric cylinder is used to drive a circular piston through two concave shells or multiple lever arms. In a further embodiment a piezoelectric bender bar is used to drive a pair of lever arms, which move a single piston with amplified motion. In another embodiment a piezoelectric circular bender plate is used to drive a curved shell. The back surface of an acoustic radiating piston and the drive section would normally, but not always, be enclosed by a housing and shield this motion from the intended radiating medium, such as water or air. Although these embodiments illustrate means and techniques for acoustic radiation from a piston, alternatively, a mechanical load can replace the pistons and in this case the transducer would be an actuator. As a reciprocal device the transducer may be used as a transmitter or a receiver and may be used in a fluid, such as water, or in a gas, such as air.

An actuator form of the transduction device is shown in the cross-section of FIG. 1A. On one-half of the AC cycle, a voltage V, on the cylinder 10 causes the circumference of the piezoelectric cylinder to increase in the radial direction R. As the edge 11 of the shells 12, which are connected to the cylinder, move outward, the central point (area) 13 of the shells, along with connecting rod 14, move in the direction Y with magnified motion causing an attached load 15 to move with this motion. On the opposite part of the cycle the cylinder 10 moves inward and the shells 12 move in the −Y direction. In this version the shells 12 may be considered as, one concave and one convex. The shells 12 may be slotted along the radius and, in the direction of the radius to reduce the circumferential stiffness, and the piezoelectric cylinder may be driven through piezoelectric 31 or 33 mode coupling. Although only one shell is needed, the use of two shells with a stiff connecting rod 14 allows the use of a cylinder of significant length. The shell is shown connected to the top of the cylinder in this instance. It may also be connected to the inside or the outside of the ring or in the case of a staved structure, between the piezoelectric staves. This structure may also be used as an acoustic transducer.

Figure 1B:
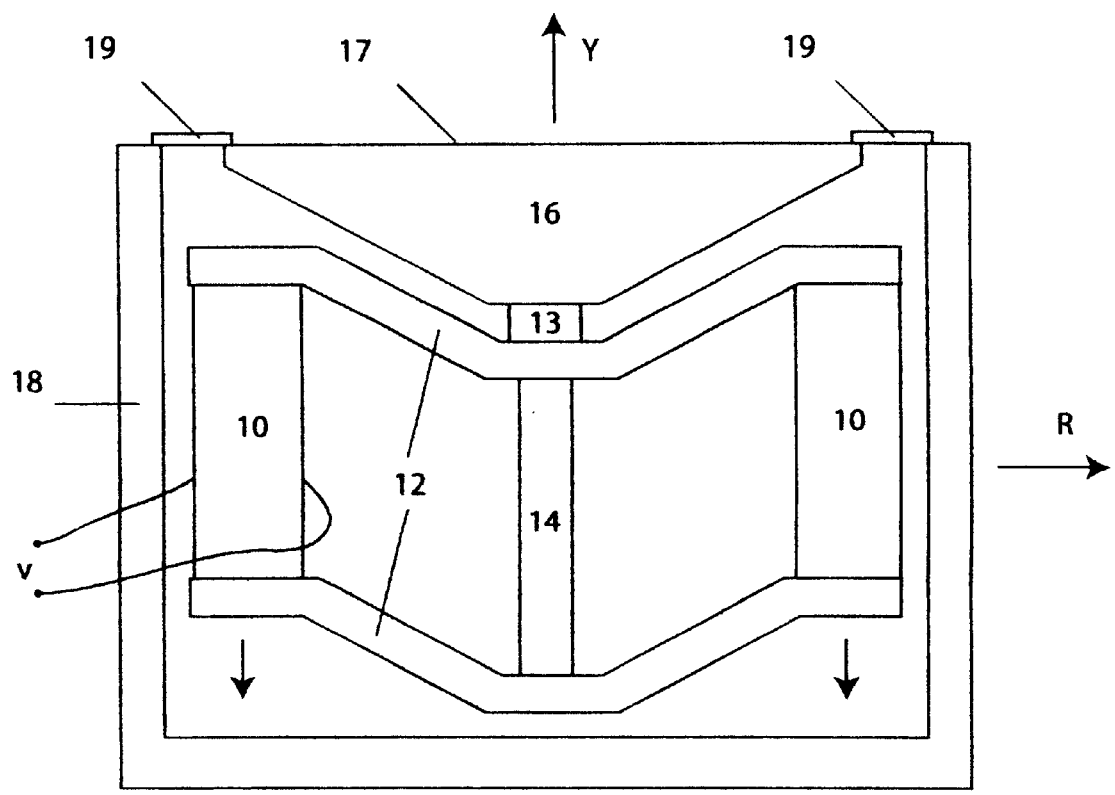
FIG. 1B illustrates a further electro-mechanical transducer embodiment of FIG. 1A showing a piston for acoustic radiation.

An improved acoustic radiator form of the transduction device is shown in the cross section of FIG. 1B. A piston 16 radiating from surface 17 is connected to one of the shells 12 at the point 13 of maximum motion and housed in container 18, to shield any back radiation from the radiation from surface 17, and to isolate the piston 16 through the compliant surround 19 attached to the container 18. As in the case of FIG. 1A, the piston 16 moves with amplified motion in the direction Y as a result of the radial motion of the cylinder 10 in the direction R due to a voltage V. As the lever arms or shells 12 exert a force on the piston in the direction Y and move it in the direction Y, an opposite force is exerted on the cylinder 10 in the −Y direction which thus provides an inertial mass (consisting of at least cylinder 10 and shells 12) allowing motion of the piston mass. If the mass of the ring (cylinder and shells) is greater than the mass of the piston, the piston will move with a greater velocity with a ratio given essentially through the ratio of the two masses.

Figure 1C:
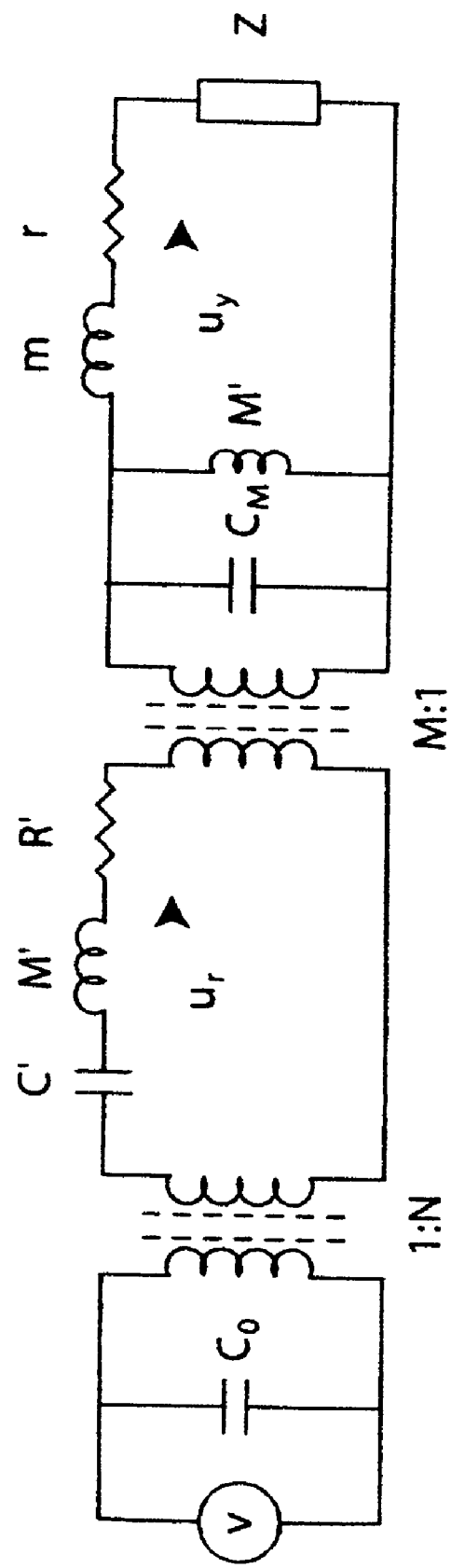
FIG. 1C shows a simplified equivalent circuit of the transducer shown in FIG. 1B.

An approximate equivalent circuit for the apparatus of FIG. 1A and FIG. 1B is given in FIG. 1C. The ring or cylindrical piezoelectric driver is approximately represented by the clamped capacity $C_0$, the electro-mechanical turns ratio N and the effective radial compliance C', mass M' and mechanical loss R'. The lever arms or shells are represented by the magnification factor M and the compliance $C_M$. The piston mass is m, while r is the mechanical losses associated with the piston motion and Z is radiation load impedance of the radiating piston or the actuator load. Notice that the mass of the ceramic ring, M', appears in both the ring and the piston branch circuits. The radial velocity of the cylinder is $u_r$ and the axial piston velocity is $u_y$.

Transducers have been fabricated and modeled using the above equivalent circuit and a finite element program A small transducer using a 31-mode cylinder drive yielded a resonance in the vicinity of 3.5 kHz from a transducer with piston diameter approximately 3 inches and length approximately 1.75 inches. A larger transducer using a 33 mode staved ring piezoelectric drive, to drive two slotted shells and one piston was also fabricated and tested. The larger device used a 12-inch diameter piston with an overall transducer depth of less than 12 inches. The result was a wide band performance from the fundamental piston-shell-ring resonance in the vicinity of 1 kHz with response up to approximately 6 kHz where the ring resonance and head flexure dominate.

Figure 1D:
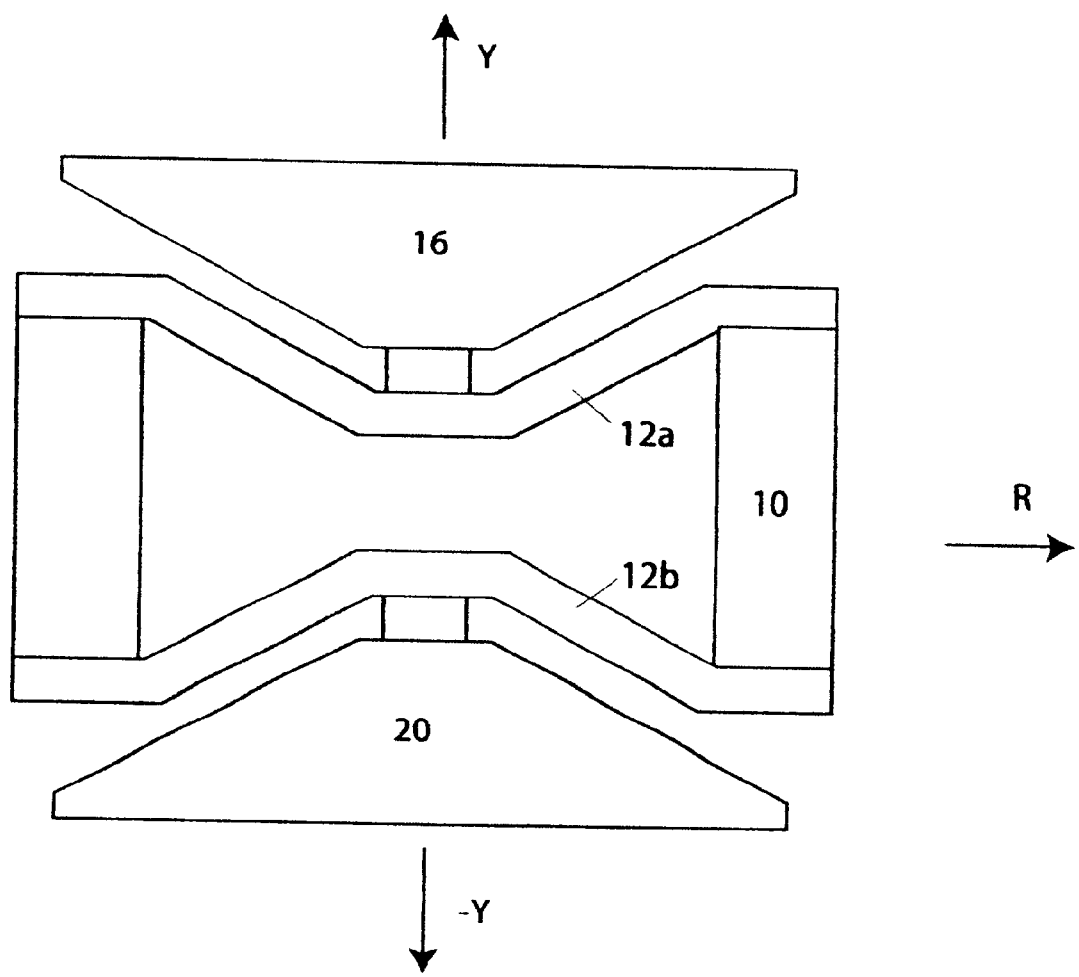
FIG. 1D schematically illustrates a contrasting symmetrical dual piston radiator.

By way of contrast, an alternative embodiment to the embodiment of FIG. 1B is shown in FIG. 1D. Notice here that the lever arms or shell, 12a and 12b are both concave and each separately connects to a respective piston such as the pistons 16 and 20. In this balanced system both pistons 16 and 20 move outward as the ring expands in the R direction. In this case the piezoelectric cylinder 10 does not move in the Y direction and does not appear as a mass element M' in the circuit loop to the right of the magnification transformer M of the equivalent circuit of FIG. 1C.

Figure 2A:
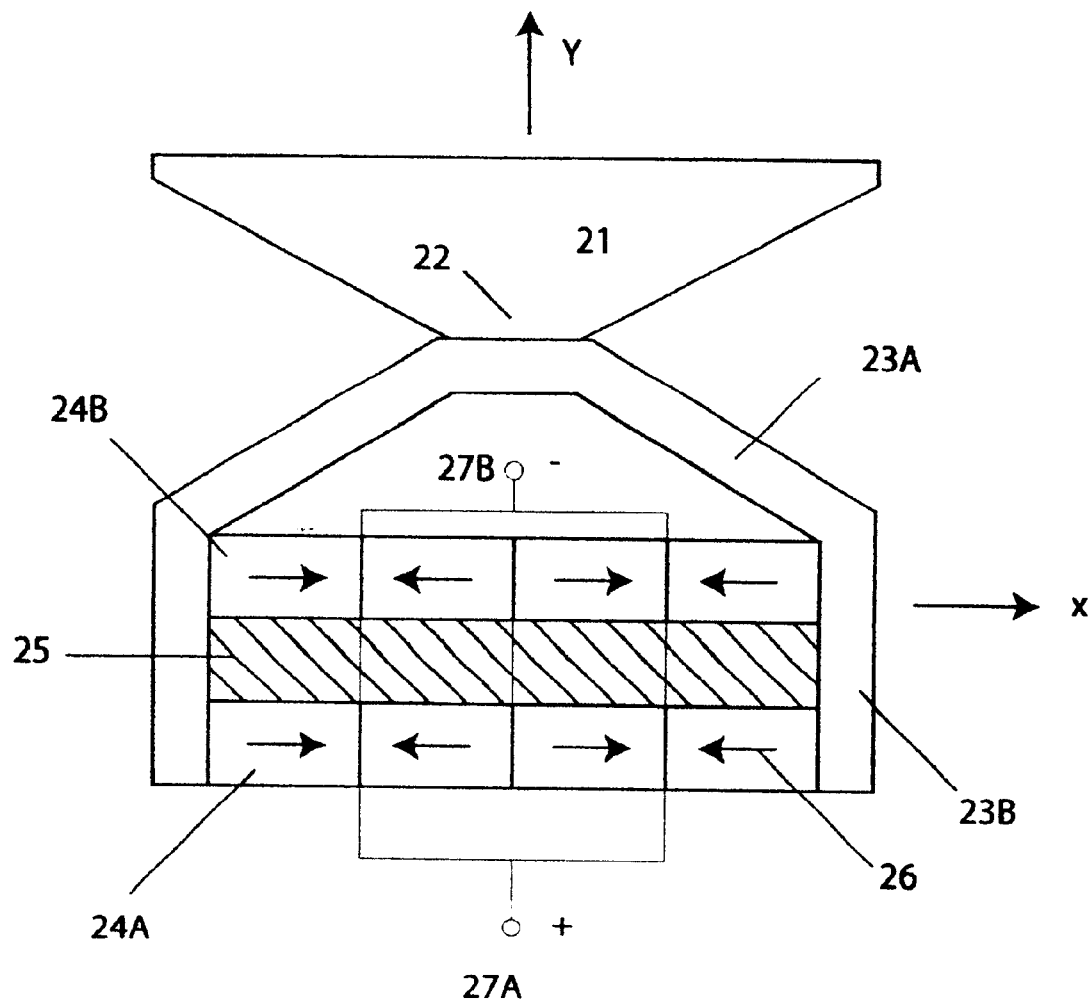
FIG. 2A schematically illustrates the cross section of a piezoelectric bender bar driver with piston.
Figure 2B:
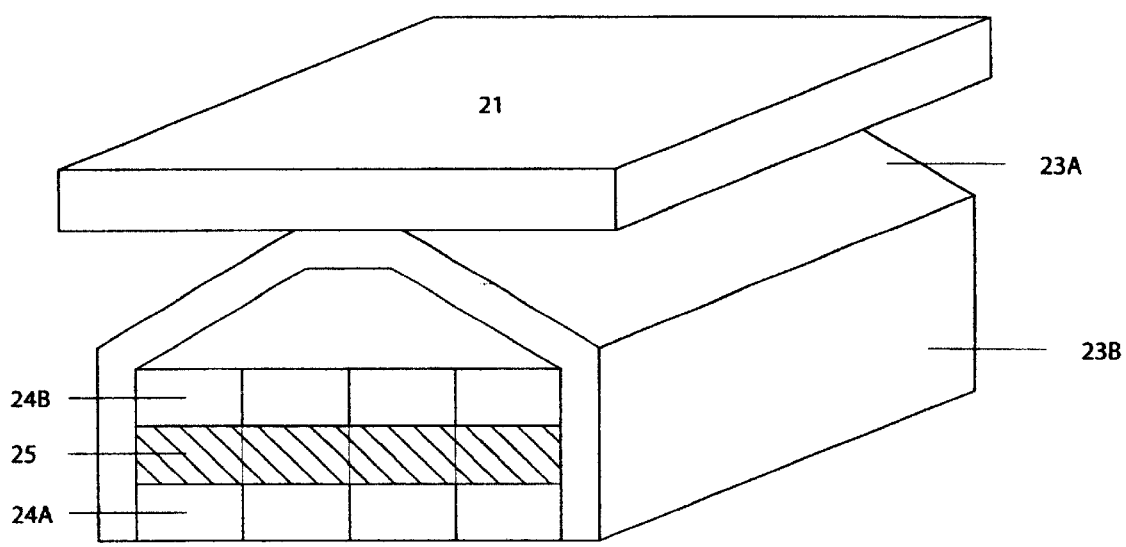
FIG. 2B illustrates a perspective sketch of the cross section illustration of FIG. 2A.
Figure 2A:
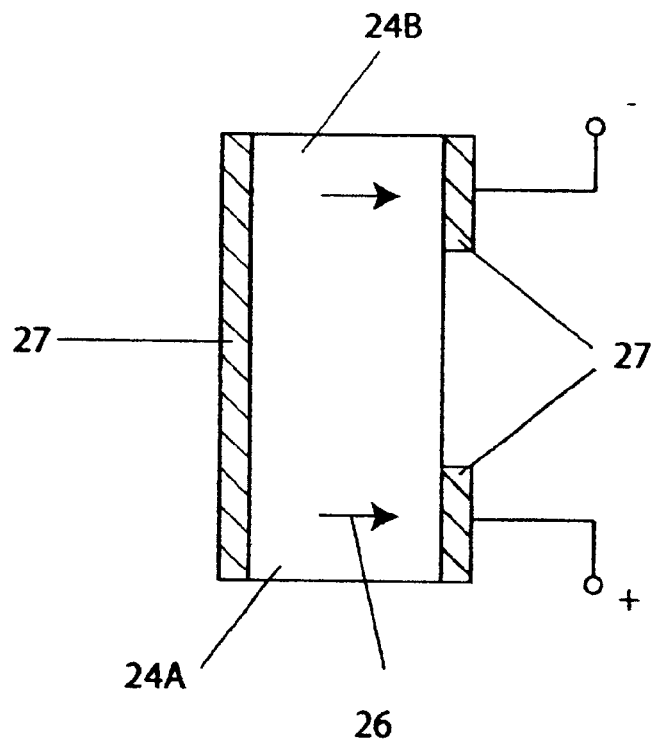
Figure 2A:
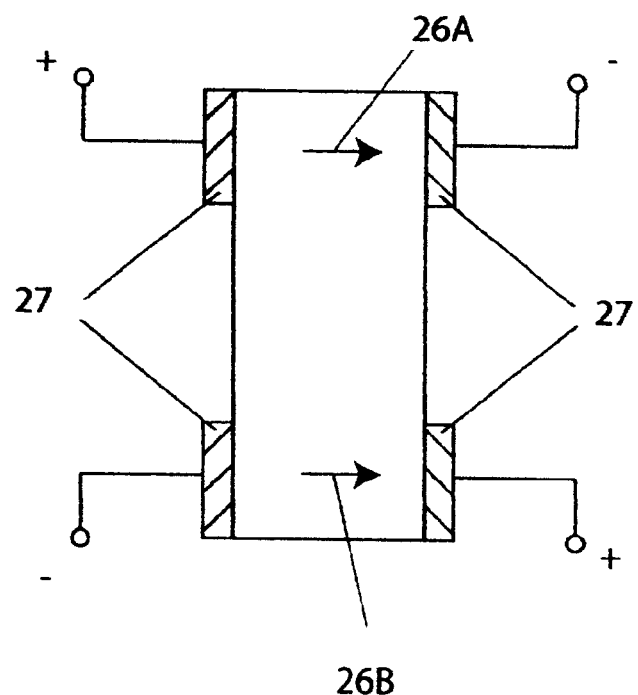

A transducer that is excited through the bending of a piezoelectric, electrostrictive or single crystal driver is illustrated in cross-section in FIG. 2A. A perspective view is illustrated in FIG. 2B showing a square piston in this particular instance. The piston 21 contacts, at location 22, the lever arms or shell 23A, end piece extensions 23B and the active piezoelectric bender 24A and 24B. The active piezoelectric bender 24A and 24B are illustrated with four piezoelectric pieces each with inactive piezoelectric material or substrate 25, polarization arrows 26 and electrical terminals 27A and 27B. The width of the inactive material 25 may be optimized for maximum performance. A series-parallel wired arrangement is illustrated where the direction of polarization is the same above and below the inactive area 25. A single piezoelectric element, with silvered electrode surfaces 27, is shown in FIG. 2AA. An alternative, more general wiring scheme is shown in FIG. 2AB. A simple all-parallel wiring scheme may be used if the polarization direction 26 is reversed on one end of the plate such as at 26A.

With an alternating potential V across terminals 27A and 27B the piezoelectric section 24A expands and the piezoelectric section 24B contracts, causing bending motion about the mid plane in area 25, with the bending reversed on the next half cycle. This bending motion causes the end pieces 23B to twist and alternately move inward and outward in the X direction at the junction between sections 23A and 23B, moving the lever arms 23A in the X direction causing a magnified piston motion in the Y direction. As the piston moves in the Y direction the piezoelectric drive moves, in opposition, in opposite Y direction, and thus, the piezoelectric section acts as both a drive and a reaction mass.

The result is a very compact transducer where the driver operates in both a bending mode and inertial mode.

Figure 3A:
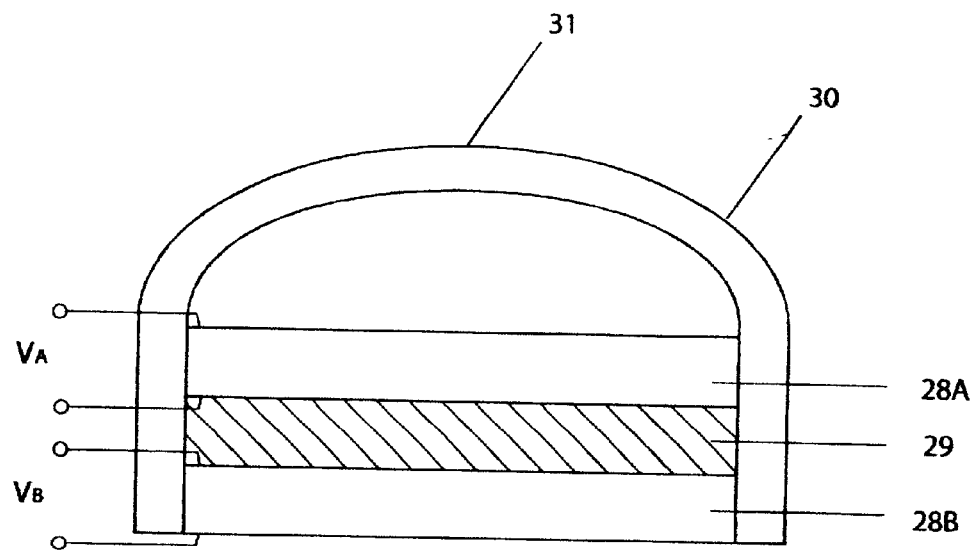
FIG. 3A schematically illustrates a simpler form with a simple shell and lateral electro-mechanical coupling.
Figure 3B:
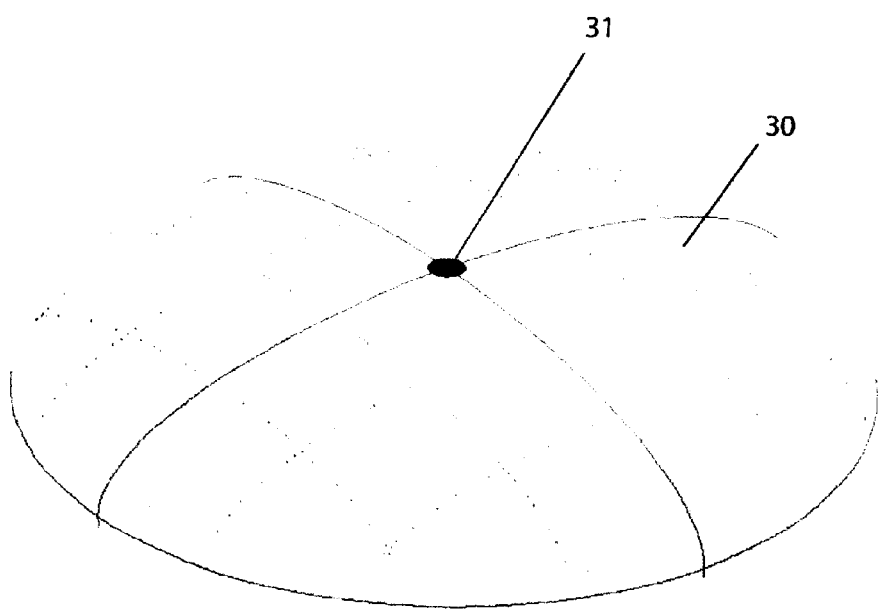
FIG. 3B schematically illustrates a perspective of an axi-symmetric version of the simpler form of FIG. 3A with a dome type shell, such as an oblate spheroid, driven by circular bender disc.
Figure 3C:
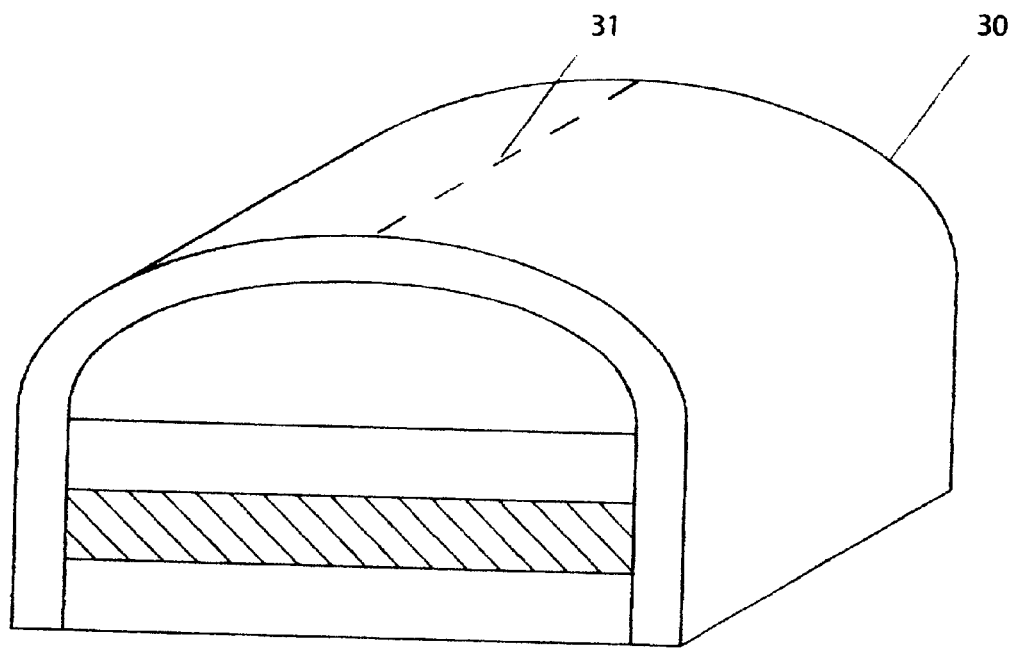
FIG. 3C schematically illustrates a perspective of FIG. 3A with a curved section, such as an elliptical shell driven with rectangular bender pates operating in the 33 or 31 modes.

An alternative planar mode bender disc-type drive could also be used along with a conical, preferably slotted, shell lever system with a conical piston connected to the apex. This type could be readily used as a less expensive alternative with either a trilaminar or bilarnminar bender construction. One such embodiment is illustrated in cross-section in FIG. 3A showing a curved shell 30 without a piston. Alternatively one could consider part of the shell as equivalent to the load or piston. Here the shell would be the entire acoustic radiator or, when operated as an actuator, a load could be attached to 31 the point of greatest motion. The form of the shell could be an axi-symmetrical structure such as a partial oblate spheroid shown in FIG. 3B with revolution about the maximum motion position 31 and driven by piezoelectric discs operating in the planar bending mode. Alternatively, a curved elliptical structure in the form illustrated in FIG. 3C with piezoelectric 33 or 31 mode bender bars rather than a disc could be used. The active materials in both units are driven for out of phase motion through voltages VA and VB. A series or parallel wiring scheme may be used to excite the disc or bars into a bending mode.

Figure 3D:
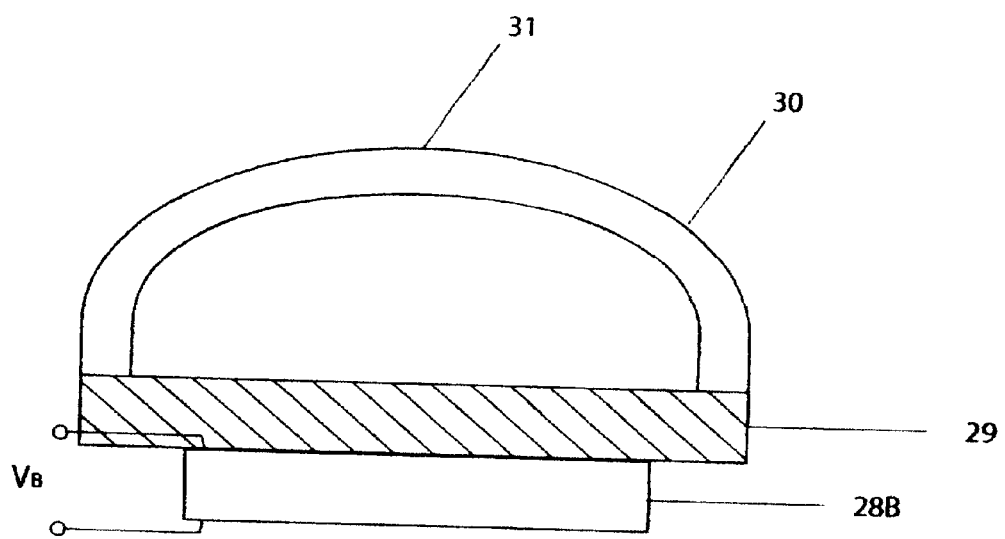
FIG. 3D schematically illustrates a bilaminar arrangement with only one piezoelectric drive bender bar or disc.

Still another alternate version of the invention is shown in FIG. 3D. This discloses a bilaminar drive single bender bar or disc 28B, energized by voltage VB, as illustrated in cross section in FIG. 3D. As the disc or bar 28B on the outer surface of material 29 expands or contracts, the inactive material 29 causes bending, yielding magnified shell 30 motion. The inactive material 29 can be the same as the shell 30, allowing a simple one-piece structure, and the piezoelectric member 28B can, alternatively, be adhered to the inner, rather than the outer, surface of material 29.

Finite element and experimental models have been constructed to verify the performance of the device illustrated in FIG. 2B. One model uses eight piezoelectric bars each 0.053 inches thick with a 0.95-inch square piston head and 0.029-inch thick steel lever arms with magnification of approximately 3. The overall drive section size is 0.6×0.7 inches and the total depth of the device is less than 0.6 inches. The measured results show a smooth broadband performance from 10 kHz through 50 kHz with a fundamental piston-lever arm-piezoelectric resonance in the vicinity of 11 to 12 kHz with the upper band limited by the next bending resonance of the drive section.

Margins or insulation may be needed to avoid electrical short circuits. Mechanical connections should be made with high strength epoxy and possibly bolts and welding. Compression bolts, tension wires, fiber wrapping or shell compression should be employed for high output applications. Compression bolts within or near the neutral plane in the case of the bender drive apparatus would have the least detrimental effect on the performance.

Having now described a limited number of embodiments of the present invention, it should now become apparent to those skilled in the art that numerous other embodiments and modifications thereof are contemplated as falling within the scope of the present invention as defined in the appended claims.

What is claimed is:

1. An electro-mechanical transduction apparatus comprising: a shell or beam structure having oppositely-disposed sides and orthogonally disposed first and second shell axes; a transduction drive means having moving ends; coupled to the shell and disposed for drive along said first shell axis; a mechanical load coupled at only one of said oppositely-disposed sides thereof, to the shell at a location along said second shell axis and at a position outside of said transducer shell; and means for exciting said transduction drive means to cause said shell, and said drive means, to move along the direction of said second axis for driving said load, said transduction drive means moving in the direction of said first axis to activate the shell, and to simultaneously move as an inertial reaction mass in the direction of said second axis.

2. An electro-mechanical transduction apparatus as set forth in claim 1 wherein the transduction drive means and said shell move together as the reaction mass in the direction of the second axis.

3. An electro-mechanical transduction apparatus as set forth in claim 1 wherein the direction of said second axis includes positive direction Y and opposed negative direction −Y, and wherein said transduction drive means, when driven, moves said load in the direction Y, while simultaneously providing the inertial reaction mass in the direction −Y.

4. An electro-mechanical transduction apparatus as set forth in claim 1 wherein the transduction drive means is piezoelectric, electrostrictive, single crystal, magnetostrictive, ferromagnetic shape memory alloy or other electro-mechanical drive material or transduction system.

5. An electro-mechanical transduction apparatus as set forth in claim 1 wherein the transduction drive means is in the form of a ring or a cylinder operated in the 33 or 31 mode.

6. An electro-mechanical transduction apparatus as set forth in claim 1 wherein the transduction drive means is in the form of a bender bar, disc or plate operated in the planar, 31 or 33 mode.

7. An electro-mechanical transduction apparatus as set forth in claim 1 wherein the load is in the form of an acoustic radiating piston.

8. An electro-mechanical transduction apparatus as set forth in claim 7, which is compliantly mounted from the front, back or edge of the acoustic radiating piston.

9. An electro-mechanical transduction apparatus as set forth in claim 1 wherein the load is an acoustical, mechanical or optical device.

10. An electro-mechanical transduction apparatus as set forth in claim 1 wherein the mechanical load is the only separate mechanical load that couples with the shell or beam structure.

11. An electro-mechanical transduction apparatus as set forth in claim 10 wherein the shell is substantially in the form of a partial oval, elliptical cylinder or oblate spheroid.

12. An electro-mechanical transduction apparatus as set forth in claim 1 wherein the shell is curved or is in a form where bars or plates are joined at the apex and connected to the electro-mechanical drive producing amplified motion at the apex.

13. An electro-mechanical transduction apparatus as set forth in claim 11 wherein the shell or bars form a concave or convex structure with one concave shell and one convex shell to provide shells that extend in the same direction.

14. An electro-mechanical transduction apparatus as set forth in claim 1 wherein compression bolts, wire or fibers are used to compress the electro-mechanical drive stack.

15. An electro-mechanical transduction apparatus as set forth in claim 1 wherein the connecting lever arm shells or bars are notched near the ends for better hinge action.

16. An electro-mechanical transduction apparatus as set forth in claim 1 wherein the connecting lever arm shells are slotted to reduce circumferential stiffness.

17. An electro-mechanical transduction apparatus comprising: an electro-mechanical driver; a mechanical load; and at least one deflection structure supported from the driver and for coupling to drive the load; said driver, deflection structure and mechanical load constructed and arranged to define a drive axis, and orthogonal thereto, an orthogonal axis; said driver, when driven, providing a reactive mass that moves relative but opposite to the mass of the load, both in the direction of said drive axis, while the electro-mechanical driver itself moves in the direction of said orthogonal axis.

18. An electro-mechanical transduction apparatus as set forth in claim 17 wherein said deflection structure comprises a pair of shells, one concave and one convex to Provide shells that extend in the same direction.

19. An electro-mechanical transduction apparatus as set forth in claim 17 wherein the electro-mechanical driver functions in a dual way so that it, not only moves the deflection structure and the load, but also acts as an inertial mass for the driven load to move against.

20. An electro-mechanical transduction apparatus as set forth in claim 17 wherein the electro-mechanical driver functions in a dual way so that it, not only moves the deflection structure and the load in the direction of said drive axis, but also acts as an inertial mass for the driven load to move against in the opposite direction of said drive axis.

21. An electro-mechanical transduction apparatus as set forth in claim 17 wherein the electro-mechanical driver moves as a reactive mass in the direction of the drive axis, while at the same time imparting motion to the deflection structure and the load by movement itself in the direction of the orthogonal axis.

22. An electro-mechanical transduction apparatus as set forth in claim 17 wherein the electro-mechanical driver comprises piezoelectric, electrostrictive, single crystal, magnetostrictive, ferromagnetic shape memory alloy or other electro-mechanical drive material or transduction system.

23. An electro-mechanical transduction apparatus as set forth in claim 17 wherein the electro-mechanical driver is in the form of a ring or a cylinder operated in the 33 or 31 mode.

24. An electro-mechanical transduction apparatus as set forth in claim 17 wherein the electro-mechanical driver is in the form of a bender bar, disc or plate operated in the planar, 31 or 33 mode.

25. An electro-mechanical transduction apparatus as set forth in claim 17 wherein the load is in the form of an acoustic radiating piston.

26. An electro-mechanical transduction apparatus as set forth in claim 25, which is compliantly mounted from the front, back or edge of the acoustic radiating piston.

27. An electro-mechanical transduction apparatus as set forth in claim 17 wherein the load is an acoustical, mechanical or optical device.

28. An electro-mechanical transduction apparatus as set forth in claim 17 wherein said at least one deflection structure comprises a pair of deflection members and a mechanical load is coupled to only one of said deflection members at a location outside of said deflection members.

29. An electro-mechanical transduction apparatus as set forth in claim 28 wherein the shell is substantially in the form of a partial oval, elliptical cylinder or oblate spheroid.

30. An electro-mechanical transduction apparatus comprising: a deflection structure having opposite sides and orthogonally disposed first and second structure axes; a transduction driver having moving ends; said transduction driver coupled at its moving ends to the deflection structure and disposed for drive along said first structure axis; a single mechanical load; said mechanical load coupled to the deflection structure at at least one location of said second structure axis and disposed only at one side of said deflection structure; said transduction driver being excited to cause the deflection structure and said driver, to move along the direction of said second axis for driving said load to, in turn, provide energy radiation therefrom.

31. An electro-mechanical transduction apparatus as set forth in claim 30 wherein said deflection structure comprises a pair of spaced-apart shells, beams or levers, with the load connected outside of the deflection structures.

32. An electro-mechanical transduction apparatus as set forth in claim 31 including a connecting member coupled between the pair of deflection structures, and extending generally in the direction of said second axis.

33. An electro-mechanical transduction apparatus as set forth in claim 31 wherein said load comprises a piston.

34. An electro-mechanical transduction apparatus as set forth in claim 31 wherein the opposite sides of the deflection structure are defined by a pair of deflection members, one concave and one convex whereby these deflection members move in the same direction upon excitation of the transduction driver.

35. An electro-mechanical transduction apparatus as set forth in claim 34 wherein the mechanical load is connected to a midpoint of the deflection member to provide maximum output.

36. An electro-mechanical transduction apparatus as set forth in claim 30 wherein said deflection structure is open and includes a main piece and an extension piece.

37. An electro-mechanical transduction apparatus as set forth in claim 36 wherein the driver is disposed between the extension pieces.

38. An electro-mechanical transduction apparatus as set forth in claim 30 wherein the deflection structure is substantially in the form of a partial oval, elliptical cylinder or oblate spheroid.

39. An electro-mechanical transduction apparatus as set forth in claim 30 wherein the deflection structure is curved or is in a form where bars or plates are joined at the apex and connected to the electro-mechanical driver producing amplified motion at the apex.

40. A method of electro-mechanical transduction comprising the steps of: driving an electro-mechanical drive member in a first axis direction to, in turn, drive, through a deflection structure, a load in a second axis direction, orthogonal to said first axis direction; said electro-mechanical drive member, when driven, providing a reactive mass that moves relative but opposite to the mass of the load, both in the direction of said second axis, as the electro-mechanical drive member itself simultaneously moves in the direction of said first axis.

41. A method of electro-mechanical transduction as set forth in claim 40 wherein the transduction includes piezoelectric, electrostrictive, single crystal, magnetostrictve, ferromagnetic shape memory alloy or other electro-mechanical drive material or transduction system.

42. A method of electro-mechanical transduction as set forth in claim 40 wherein the electro-mechanical drive member is in the form of a ring or a cylinder operated in the 33 or 31 mode.

43. A method of electro-mechanical transduction as set forth in claim 40 wherein the electro-mechanical drive member is in the form of a bender bar, disc or plate operated in the planar, 31 or 33 modes.

44. An electro-mechanical transduction apparatus comprising: a deflection structure having orthogonally disposed first and second axes; a transduction driver having moving ends; said transduction driver coupled at its moving ends to the deflection structure and disposed for drive along said first axis; a mechanical load; said mechanical load coupled to the deflection structure at at least one location along said second axis; said deflection structure comprising a pair of deflection members and said load comprising a pair of load members coupled, respectively, to the pair of deflection members, wherein both load members are disposed outboard of their respective deflection members and are adapted to move in opposite directions as said transduction driver is excited and expands in the direction of said first axis, each of said deflection members being of concave form and unsupported therebetween where the loads attach.

45. An electro-mechanical transduction apparatus comprising: an electro-mechanical driver; and at least one deflection structure supported from the driver and for receiving drive energy from said electro-mechanical driver; said driver and deflection structure constructed and arranged to define a drive axis, and orthogonal thereto, an orthogonal axis; said driver, when driven, providing a reactive mass that moves relative to a mass of the deflection structure, both in the direction of said drive axis, while the electro-mechanical driver itself moves in the direction of said orthogonal axis, the direction of said drive axis includes positive direction Y and opposed negative direction –Y, and wherein said electro-mechanical driver, when driven, moves said load in the direction Y, while simultaneously providing the reactive mass in the direction –Y.

46. An electro-mechanical transduction apparatus as set forth in claim 45 wherein said deflection structure comprises a curved shell having opposite ends of the electro-mechanical driver supported between opposed ends of the curved shell.

47. A method of electro-mechanical transduction comprising the steps of exciting a driver that is connected to a load through a deflection structure, arranging the driver, load and deflection structure to provide a reactive mass that moves relative to the mass of the load and wherein the transducer electrical equivalent circuit representation of the mass of the driver is in both of two circuit loops, and wherein both circuit loops are coupled through the deflection structure representation.

* * * * *